Aug. 23, 1927.
F. W. SPERR, JR., ET AL
1,639,905
MANUFACTURE OF SODIUM THIOSULPHATE
Filed April 4, 1921
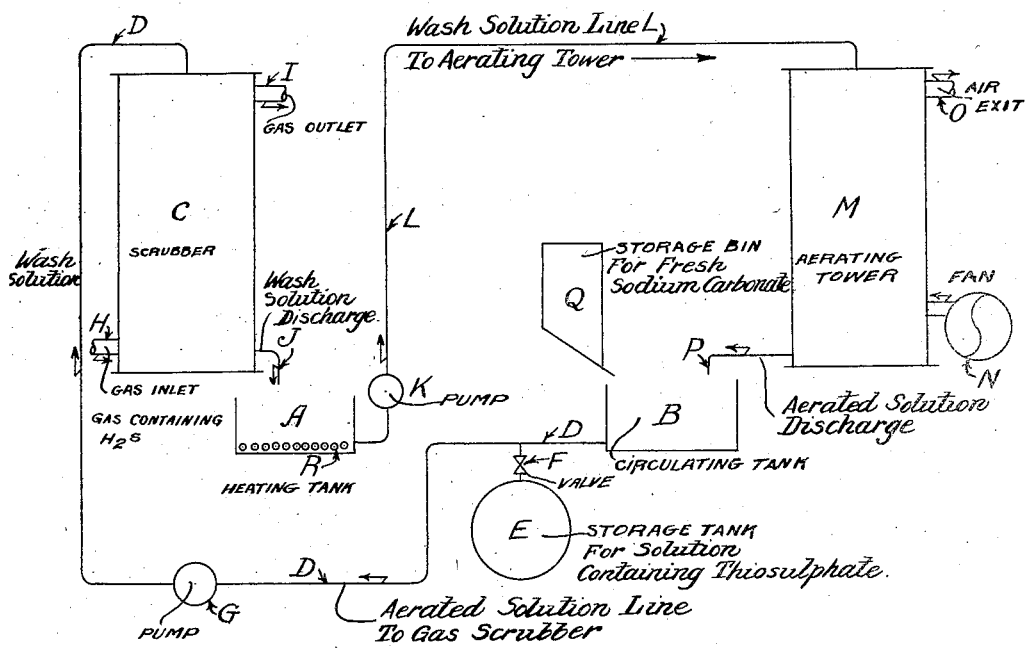

Patented Aug. 23, 1927.

1,639,905

UNITED STATES PATENT OFFICE.

FREDERICK W. SPERR, JR., AND DAVID L. JACOBSON, OF PITTSBURGH, PENNSYLVANIA, ASSIGNORS TO THE KOPPERS COMPANY, A CORPORATION OF PENNSYLVANIA.

MANUFACTURE OF SODIUM THIOSULPHATE.

Application filed April 4, 1921. Serial No. 458,265.

This invention relates to the production of alkali metal thiosulphates, such for example as sodium thiosulphate. The invention has for an object to effect the production of such thiosulphates by the utilization of hydrogen sulphide in gases containing it. Examples of such gases are: coke oven gas prior to its subjection to a gas purifying process, carbureted water gas and gases from petroleum distillation. By the invention the hydrogen sulphide, which is the principal waste product in such gases, is conserved, being converted into a valuable commercial product, such as sodium thiosulphate.

In addition to the general object recited above, the invention has for further objects such other improvements or advantages in operation and results as are found to obtain in the apparatus and process hereinafter described or claimed.

In the accompanying drawing forming a part of this specification, and showing, for purposes of exemplification, a preferred form and manner in which the invention may be embodied and practiced, but without limiting the claimed invention specifically to such illustrative instance or instances, the figure illustrates a diagrammatic representation of apparatus for carrying out the improved thiosulphate process of the present invention.

In its present embodiment, the invention is applied to the production of sodium thiosulphate, and, for convenience, the present description will be confined to this use of the invention. The features of the invention are, however, readily susceptible of other valuable applications, for example to the production of other alkali metal thiosulphates such as potassium thiosulphate; consequently the scope of the invention is not confined to the specific use and specific embodiment herein described as an illustrative example.

For effecting the absorption of sulphur compounds from the gas and the subsequent formation of thiosulphate, there is employed a water solution of an alkaline compound having an affinity for hydrogen sulphide. A number of the compounds of the alkali metals and alkali earth-metals possess this property. However, according to the present embodiment of the invention, a solution of alkaline sodium compound in water is employed. Examples of such compounds are sodium carbonate, sodium bi-carbonate, sodium sulphide and sodium hydroxide or various mixtures of the above mentioned sodium compounds. A solution of sodium carbonate in water is especially suitable for effecting the absorption of the sulphur from the gas, and assuming that this be the absorbent agent employed, the sodium carbonate solution is brought into contact with the gas containing hydrogen sulphide in a suitable apparatus whereupon the hydrogen sulphide is absorbed from the gas forming sulphur compounds in the solution. The solution containing the absorbed sulphur compounds is then brought into contact with air or other gases containing oxygen. This aeration liberates part of the hydrogen sulphide from the solution, but a portion of the sulphur compounds are oxidized to thiosulphate, such as sodium thiosulphate. On again subjecting the thus aerated solution to contact with additional gas containing hydrogen sulphide, further quantities of sulphur are absorbed and from subsequent aeration additional thiosulphate is formed; and the process is preferably carried on continuously so that the solution is continuously brought into contact with the gas and subsequently aerated. The sodium thiosulphate is very soluble and accumulates in solution, which may be brought up to any desired concentration, for example up to about the saturation point for sodium thiosulphate. Additional amounts of the alkaline sodium compounds are added to the solution from time to time to replace the sodium that is transformed into the thiosulphate.

When the solution shows the desired concentration of thiosulphate, a portion of the solution may be drawn off from the system and the sodium thiosulphate is separated from the other sodium salts and recovered, for example, by the process for the recovery of sodium thiosulphate from solutions such as are described in the co-pending application of R. E. Hall and D. L. Jacobson Serial No. 462,136, filed April 18, 1921.

The formation of thiosulphate may be considerably accelerated by heating the solution just before the aeration stage or during the aeration stage. When such heating is employed it is preferable to cool the solution before bringing it back into contact with the gas containing the hydrogen sulphide; in most cases, however, the solution will be cooled sufficiently by the aeration itself.

In applying the above stated discovery to the production of sodium thiosulphate from a gas, such as coke oven gas, a concentration of about 2 to 5 per centum of sodium carbonate in the absorbent solution will be found satisfactory. Sodium carbonate solution of other strengths may be employed and other alkaline sodium compounds may be used. The coke oven gas from the benzol scrubbers or from the final coolers is passed through a gas line H into a like scrubber C in which it passes up through a descending current of sodium carbonate solution to effect the absorption of the hydrogen sulphide from the gas. The scrubber C may be of any preferred type, for example, the so-called "benzol scrubber," filled with wooden hurdles. The gas emerges from the scrubber C through the pipe I.

The sodium carbonate solution containing the absorbed sulphur passes out of the scrubber through a discharge line J to a circulating tank A, in which it is preferable to heat the solution. Such heating may be effected by means of steam coils R placed in the tank A or steam may be blown directly into the solution in the tank. As hereinabove stated the heating acts to accelerate the formation of sodium thiosulphate in the solution. From the circulating tank A, the solution is pumped by a pump K through the pipe line L over the aerating tower M, which may be still another scrubber, similar to the scrubber C or may be a natural draft cooling tower in which the solution is aerated by being brought into contact with the atmosphere under natural draft. In the present instance, however, the drawing shows a scrubber type of apparatus into which air is blown by means of the fan N. The air together with quantities of $H_2S$ given up from the solution, passes out of the aerating tower through the pipe O. From the aerating tower the aerated solution containing sodium thiosulphate runs through the pipe P into a circulating tank B, where the solution may be mixed with fresh sodium carbonate from the storage bin Q in sufficient quantities to maintain the solution at approximately constant alkalinity. From the circulating tank B the solution is pumped by a pump G through the line D back to the scrubber C, where it is again brought into contact with the gas containing hydrogen sulphide, for the further absorption of sulphur and the further formation of sodium thiosulphate.

When the sodium thiosulphate has accumulated to a desired percentage in the solution, for example to about 10% of the solution, the valve F is opened and a portion of the solution is transferred into the storage tank E. The remaining solution in the circulating system is made up to its original volume by the addition of fresh water, and sodium carbonate from the bin Q to maintain constant alkalinity. It is preferable, before transferring the solution from the circulating system into the storage tank E to discontinue temporarily the addition of fresh sodium carbonate until the percentage of the sodium carbonate in the circulating solution is reduced to about 1 or 2 per centum. This will eliminate the separation and handling of a considerable amount of sodium carbonate in the subsequent treatment, of the solution transferred to the storage tank E. After withdrawing the solution into the storage tank, however, the remaining solution should be at once restored to its original volume and alkalinity.

The solution in the storage tank E, containing the sodium thiosulphate may then be treated for the recovery of the sodium thiosulphate in pure form, for example, according to the process described in the aforesaid co-pending application of R. E. Hall and D. L. Jacobson.

By the invention the hydrogen sulphide is removed from the gas, thereby eliminating this objectionable impurity in gases, and the commercially valuable thiosulphate of a high degree of purity is formed. When recovered from the solution, the crystallized product has five molecules of water of crystallization according to the formula $Na_2S_2O_3.5H_2O$.

The invention as hereinabove set forth may be variously embodied within the scope of the claims hereinafter made.

We claim:

1. In a process for the production of alkali metal thiosulphate, the combination of steps that consists in: passing gas containing hydrogen sulphide through an alkaline solution to absorb the hydrogen sulphide from the gas; subjecting the solution to such heating and aeration as to effect the formation of the alkali metal thiosulphate; and withdrawing from the circulating system solution for the recovery of the alkali metal thiosulphate, when the latter has accumulated in the system to about ten per centum of the total volume of the solution.

2. In a process for the production of sodium thiosulphate, the combination of steps that consists in: passing a gas containing hydrogen sulphide through sodium carbonate solution to absorb the hydrogen sulphide from the gas; subjecting the solution to such heating and aeration as to effect the formation of the sodium thiosulphate; and withdrawing from the circulating system solution for the recovery of the sodium thiosulphate, when the latter has accumulated in the system to about ten percentum of the total volume of solution.

3. In a process for the production of alkali metal thiosulphate the combination of steps that consists in: passing a gas containing hydrogen sulphide through an alkaline solution to absorb the hydrogen sulphide from the gas; heating and treating the solution containing the absorbed hydrogen sulphide with an oxidizing agent so as to effect the formation of the alkali metal thiosulphate; and withdrawing from the circulating system solution for the recovery of the alkali metal thiosulphate, when the latter has accumulated to about its saturation point in the system.

4. In a process for the production of alkali metal thiosulphate, the continuous cyclic circulation of an alkali solution through a hydrogen sulphide absorption stage in which the solution absorbs hydrogen sulphide from a hydrogen sulphide bearing gas, continued with the continuous heating and aeration of the cyclically-circulating solution discharged from the absorption stage, to effect the progressive formation of alkali metal thiosulphate in the solution, the withdrawal of solution from the circulating system for the recovery of the thiosulphate, when the latter has accumulated in the system to about ten per centum of the total volume of solution, and thereafter the addition of further alkali metal salt to the solution in the circulating system to restore the solution to its original alkalinity for absorption of hydrogen-sulphide.

In testimony whereof we have hereunto set our hands.

FREDERICK W. SPERR, Jr.
DAVID L. JACOBSON.